Feb. 28, 1928.

J. FALLEK 1,661,036

GRAPEFRUIT SHIELD

Filed Feb. 15, 1927

WITNESSES

INVENTOR
Joseph Fallek
BY
ATTORNEY

Patented Feb. 28, 1928.

1,661,036

UNITED STATES PATENT OFFICE.

JOSEPH FALLEK, OF BROOKLYN, NEW YORK.

GRAPEFRUIT SHIELD.

Application filed February 15, 1927. Serial No. 168,365.

This invention relates to dining accessories, and has particular reference to a shield for attachment to a halved grapefruit or other similar citrous fruit for preventing spattering of the juice when eating.

One of the principal objects and advantages of the present invention resides in the provision of an improved shield of the character set forth in the nature of a hood or element having means which facilitates the attachment of the same to, or its removal from, the fruit, which means is so constructed as to render the same readily adaptable to fruits of various sizes.

The invention furthermore comprehends a grapefruit or similar citrous fruit shield which is extremely simple in its construction, inexpensive to manufacture and which is highly efficient in its purpose.

With the above recited and other objects in view, reference is had to the following specification and accompanying drawings, in which there is exhibited one example of an embodiment of the invention, which is in no way intended as a limitation of the scope of the appended claims, as it is to be clearly understood that variations and modifications which properly fall within the scope of said claims, may be resorted to when found expedient.

In the drawings—

Figure 1:
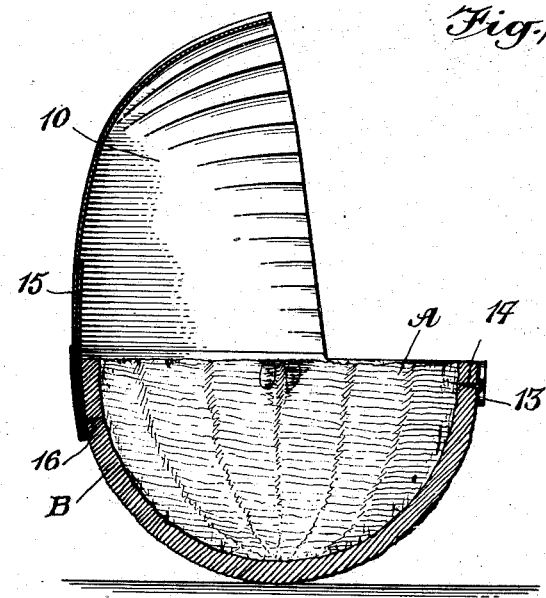
Figure 1 is a vertical sectional view through the shield applied to the fruit.
Figure 2:
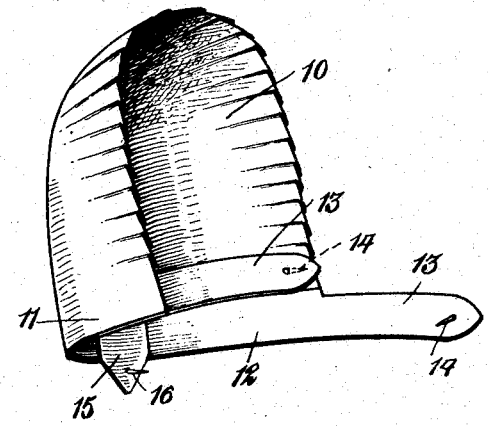
Figure 2 is a perspective view of the shield removed from the fruit.

Referring to the drawings by characters of reference, A designates a halved grapefruit, orange or other citrous fruit of this character. The shield which is adapted to be associated therewith for preventing the spattering of the juice when eating the fruit preferably includes a hood shaped body 10, the lower end 11 of which is generally shaped to conform to the configuration of the fruit to which it is applied. The shield is preferably constructed of waxed paper and a strip 12 is arranged and secured within the lower end 11, the strip having extensions 13 protruding beyond the lower end 11. Inward radially projecting tines 14 are carried by the free terminals of the extensions 13. Arranged within and depending from the medial portion of the lower end 11 is a strip 15 having a radially inwardly projecting tine 16.

In practice, the lower end 11 of the shield 10 is arranged in embracing relation to the upper halved portion of the fruit A and the tines 14 and 16 are respectively embedded or anchored in the skin or rind B of the fruit so that the hood shaped body 10 projects upwardly above the fruit to catch and prevent the spattering of the juice when eating the same. In view of the fact that the hood shaped body 10 and the strips 12 are flexible to a degree, it is obvious that the device may accommodate fruits of various sizes. It is to be further understood that within the scope of the invention the shield may be made of any desired material, but it is preferable to make the same of paper or other cheap material, whereby the same may be thrown away after a single use. The shield body and the strips 12 and 15 may be used to bear advertising matter.

I claim:

1. As a new article of manufacture, a shield of the character described, comprising a substantially hood-shaped body of flexible material and having a substantially semi-circular lower end, flexible arms projecting horizontally from the lower end, and tines carried by the free ends of the arms and by the medial portion of the lower end, said tines projecting radially inward and adapted for anchorage in the skin or rind of the fruit.

2. As a new article of manufacture, a shield of the character described, comprising a substantially hood-shaped body of flexible material and having a substantially semi-circular lower end, flexible arms projecting horizontally from the lower end, and tines carried by the free ends of the arms and by the medial portion of the lower end, said tines projecting radially inward and adapted for anchorage in the skin or rind of the fruit, the said medial tine being supported and disposed slightly below the lower edge of the body.

3. As a new article of manufacture, a shield of the character described comprising a substantially hood-shaped flexible body having a substantially semi-circular open lower end adapted to receive the upper halved portion of the fruit and provided at said lower end with means for penetrating the skin or rind of the fruit.

4. As a new article of manufacture, a shield of the character described comprising a substantially hood-shaped body of paper, said body having horizontally extending members at its lower end, and a downwardly extending member at the medial portion of the lower end, said members being of paper and provided with tines at their ends.

JOSEPH FALLEK.